United States Patent
Hosseini-Asl et al.

(10) Patent No.: US 10,783,875 B2
(45) Date of Patent: Sep. 22, 2020

(54) UNSUPERVISED NON-PARALLEL SPEECH DOMAIN ADAPTATION USING A MULTI-DISCRIMINATOR ADVERSARIAL NETWORK

(71) Applicant: salesforce.com, inc., San Francisco, CA (US)

(72) Inventors: Ehsan Hosseini-Asl, Palo Alto, CA (US); Caiming Xiong, Palo Alto, CA (US); Yingbo Zhou, San Jose, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 146 days.

(21) Appl. No.: 16/027,111

(22) Filed: Jul. 3, 2018

(65) Prior Publication Data
US 2019/0295530 A1 Sep. 26, 2019

Related U.S. Application Data

(60) Provisional application No. 62/647,459, filed on Mar. 23, 2018, provisional application No. 62/644,313, filed on Mar. 16, 2018.

(51) Int. Cl.
| | | |
|---|---|---|
| *G10L 15/07* | (2013.01) | |
| *G10L 15/22* | (2006.01) | |
| *G10L 15/16* | (2006.01) | |
| *G06N 3/08* | (2006.01) | |

(52) U.S. Cl.
CPC ............... *G10L 15/07* (2013.01); *G06N 3/08* (2013.01); *G10L 15/16* (2013.01); *G10L 15/22* (2013.01)

(58) Field of Classification Search
CPC ......... G10L 15/07; G10L 15/16; G10L 15/22; G06N 3/08
See application file for complete search history.

(56) References Cited

U.S. PATENT DOCUMENTS

| | | | |
|---|---|---|---|
| 7,451,077 B1 | 11/2008 | Lindau et al. | |
| 7,720,012 B1 * | 5/2010 | Borah ................. | G10L 17/20 370/230 |
| 8,121,367 B2 | 2/2012 | Socher et al. | |
| 8,355,550 B2 | 1/2013 | Zhang et al. | |
| 8,872,909 B2 | 10/2014 | Kumar et al. | |
| 9,432,671 B2 | 8/2016 | Campanelli et al. | |
| 10,282,663 B2 | 5/2019 | Socher et al. | |

(Continued)

OTHER PUBLICATIONS

Mimura et al., Cross-Domain Speech Recognition Using Non-parallel Corpora with Cycle-Consistent Adversarial Networks, 2017, IEEE, whole document (Year: 2017).*

(Continued)

*Primary Examiner* — Sonia L Gay
(74) *Attorney, Agent, or Firm* — Haynes and Boone, LLP (57) ABSTRACT

A system for domain adaptation includes a domain adaptation model configured to adapt a representation of a signal in a first domain to a second domain to generate an adapted presentation and a plurality of discriminators corresponding to a plurality of bands of values of a domain variable. Each of the plurality of discriminators is configured to discriminate between the adapted representation and representations of one or more other signals in the second domain.

20 Claims, 9 Drawing Sheets

(56) References Cited

U.S. PATENT DOCUMENTS

| | | |
|---|---|---|
| 10,346,721 B2 | 7/2019 | Albright et al. |
| 2016/0350653 A1 | 12/2016 | Socher et al. |
| 2017/0024645 A1 | 1/2017 | Socher et al. |
| 2017/0032280 A1 | 2/2017 | Socher et al. |
| 2017/0140240 A1 | 5/2017 | Socher et al. |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1 | 10/2018 | Paulus |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0087730 A1* | 3/2019 | Saito .................... G06N 3/088 |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |

OTHER PUBLICATIONS

Arjovsky et al., "Wasserstein Generative Adversarial Networks," International Conference on Machine Learning. Sydney, Australia. Aug. 6-11, 2017. pp. 1-32.

Ben-David et al., "A Theory of Learning from Different Domains," Machine Learning, vol. 79. 2010. DOI: 10.1007/S10994-009-5152-4. pp. 1-25.

Bousmalis et al., "Unsupervised Pixel-Level Domain Adaption with Generative Adversarial Networks," IEEE conference on Computer Vision and Pattern Recognition, vol. 1. Honolulu, HI. Jul. 21-26, 2017. pp. 1-15.

Chen et al., "Voice Conversion Using Deep Neural Networks With Layer-Wise Generative Training," IEEE/ACM Transactions on Audio, Speech, and Language Processing. vol. 22, No. 12. Dec. 2014. pp. 1-14.

Desai et al., "Spectral Mapping Using Artificial Neural Networks for Voice Conversion," IEEE Transactions on Audio Speech and Language Processing, Aug. 2010. pp. 1-12.

Donahue et al., "Synthesizing Audio with Generative Adversarial Networks," eprint arXiv:1802.04208. CoRR. Available Online: https://arxiv.org/pdf/1802.04208.pdf. pp. 1-11.

Durugkar et al., "Generative Multi-Adversarial Networks," Published as a Conference Paper at the International conference on Learning Representation, Palais des Congrès Neptune, Toulon, France. Apr. 24-26, 2017. pp. 1-14.

Garofolo et al., "TIMIT Acoustic-Phonetic Continuous Speech Corpus LDC93S1," Philadelphia: Linguistic Data Consortium, 1993. 1 page.

Ge et al., "Borrowing Treasures from the Wealthy: Deep Transfer Learning Through Selective Joint Fine-Tuning," IEEE Conference on Computer Vision and Pattern Recognition, vol. 6. Honolulu, HI Jul. 21-26, 2017. pp. 1-10.

Gebru et al., "Fine-Grained Recognition in the Wild: A Multi-Task Domain Adaption Approach," IEEE Conference on computer Vision and Pattern Recognition. Honolulu, HI. Jul. 21-26, 2017. pp. 1-10.

Ghosh et al., "Multi-Agent Diverse Generative Adversarial Networks," Conference on Computer Vision and Pattern Recognition. Salt Lake City, Utah. Jun. 18-22, 2018. pp. 1-17.

Goodfellow et al., "Generative Adversarial Nets," Advances in Neural Information Processing Systems, 27. Montreal, Canada. Dec. 8-13, 2014. pp. 1-9.

Griffin et al., "Signal Estimation from Modified Short-Time Fourier Transform," IEEE Transactions on Acoustics, Speech, and Signal Processing, vol. ASSP-32, No. 2. Apr. 1984. pp. 1-8.

Gupta et al., "Cross Modal Distillation for Supervision Transfer," Computer Vision and Pattern Recognition. Las Vegas, NV. Jun. 26-Jul. 1, 2016. pp. 1-14.

Helander et al., "Voice Conversion Using Partial Least Squares Regression," IEEE Transactions on Audio, Speech and Language Processing, vol. 18, No. 5. Jul. 2010. pp. 1-10.

Hoffman et al., "CyCADA: Cycle-Consistent Adversarial Domain Adaption," International Conference on Learning Representations. Vancouver, Canada. Apr. 30-May 3, 2018. pp. 1-15.

Hosseini-Asl et al., "A Multi-Discriminator CycleGAN for Unsupervised Non-Parallel Speech Domain Adaption," Published in Interspeech. Stockholm, Sweden. Aug. 20-24, 2017. pp. 1-7.

Hsu et al., "Unsupervised Domain Adaptation for Robust Speech Recognition Via Variational Autoencoder-Based Data Augmentation," Accepted to IEEE Automatic Speech Recognition and Understanding, 2017. pp. 1-8.

Hsu et al., "Unsupervised Learning of Disentangled and Interpretable Representations from Sequential Data," 31st Conference on Neural Information Processing Systems (NIPS 2017), Long Beach, CA. pp. 1-23.

Hsu et al., "Voice Conversion from Unaligned Corpora Using Variational Autoencoding Wasserstein Generative Adversarial Networks," Submitted to Interspeech. Stockholm, Sweden. 2017. pp. 1-5.

Hu et al., "Deep Transfer Metric Learning," Conference on Computer Vision and Pattern Recognition. Boston, Massachusetts. Jun. 8-10, 2015. pp. 1-9.

Huang et al., "Correcting Sample Selection Bias by Unlabeled Data," Twenty-First Annual Conference on Neural Information Processing Systems. Vancouver, Canada. Dec. 6, 2007. pp. 1-8.

Huang et al., "Densely Connected Convolutional Networks," Conference on Computer Vision and Pattern Recognition. Honolulu, HI. Jul. 21-26, 2017. pp. 1-9.

Isola et al., "Image-to-Image Translation with Conditional Adversarial Networks," IEEE Conference on Computer Vision and Pattern Recognition. Hawai'i Convention Center, Honolulu, HI. Jul. 21-26, 2017. pp. 1-17.

Kaneko et al., "Parallel-Data-Free Voice Conversion Using Cycle-Consistent Adversarial Networks," arXiv:1711.11293., 2017. Available Online: https://arxiv.org/pdf/1711.11293.pdf. pp. 1-5.

Kaneko et al., "Sequence-to-sequence Voice Conversion with Similarity Metric Learned Using Generative Adversarial Networks," INTERSPEECH. Stockholm, Sweden. 2017. pp. 1-5.

Kim et al., Learning to Discover Cross-Domain Relations with Generative Adversarial Networks, Proceedings of the 34th International Conference on Machine Learning, vol. 70. Sydney, Australia. Aug. 6-11, 2017. pp. 1-10.

Kingma et al., "Auto-Encoding Variational Bayes," Submitted to the International Conference on Learning Representations. Banff, Canada. Apr. 14-16, 2014. pp. 1-14.

Kumar et al., "Semi-Supervised Learning with GANs: Manifold Invariance with Improved Inference," 31st Conference on Neural Information Processing Systems. Long Beach, CA. Dec. 4-9, 2017. pp. 1-11.

Lecun et al., "Gradient-Based Learning Applied to Document Recognition," Proceedings of the IEEE. Nov. 1998. pp. 1-46.

Liu et al., "Coupled Generative Adversarial Networks," 29th Conference on Neural Information Processing Systems. Barcelona, Spain. Dec. 5-10, 2016. pp. 1-32.

(56) References Cited

OTHER PUBLICATIONS

Liu et al., "Unsupervised Image-to-Image Translation Networks," 31st Conference on Neural Information Processing Systems. Long Beach, CA. Dec. 4-9, 2017. pp. 1-11.

Mao et al., "Least Squares Generative Adversarial Networks," IEEE International Conference on Computer Vision. Venice, Italy. Oct. 22-29, 2017. pp. 1-16.

Michelsanti et al., "Conditional Generative Adversarial Networks for Speech Enhancement and Noise-Robust Speaker Verification," Interspeech, Stockholm, Sweden. Aug. 20-24, 2017. pp. 1-5.

Mirza et al., "Conditional Generative Adversarial Nets," CoRR, vol. abs/1411.1784. Available Online: https://arxiv.org/pdf/1411.1784.pdf. pp. 1-7.

Mohammadi et al., "Voice Conversation Using Neural Networks With Speaker-Independent Pre-Training," IEEE Spoken Language Technology Workshop (SLT). Lake Tahoe, California and Nevada. Dec. 7-10, 2014. pp. 1-5.

Nakashika et al., "High-Order Sequence Modeling Using Speaker-Dependent Recurrent Temporal Restricted Boltzmann Machines for Voice Conversion," Interspeech. Singapore. Sep. 14-18, 2014. pp. 1-5.

Nakashika et al., "Voice Conversion Based on Speaker-Dependent Restricted Boltzman Machines," The Institute of Electronics, Information and Communication Engineers (IEICE), Transactions Information & Systems., vol. 97D, No. 6. Jun. 2014. pp. 1-8.

Netzer et al., "Reading Digits in Natural Images with Unsupervised Feature Learning," Conference on Neural Information Processing Systems. Granada, Spain. Dec. 12-17, 2011. pp. 1-9.

Odena et al., "Deconvolution and Checkerboard Artifacts," Distill, 2016. Available Online: https://distill.pub/2016/deconv-checkerboard/. pp. 1-8.

Pascual et al., "SEGAN: Speech Enhancement Generative Adversarial Network," Interspeech. Stockholm, Sweden. 2017. pp. 1-5.

Peddinti et al., "A Time Delay Neural Network Architecture for Efficient Modeling of Long Temporal Contexts," Interspeech, 2015. pp. 1-5.

Ronneberger et al., "U-Net: Convolutional Networks for Biomedical Image Segmentation," 8th International Conference on Medical Image Computing and Computer Assisted Intervention. Munich, Germany. Oct. 5-9, 2015. pp. 1-8.

Sainath et al., "Deep Convolutional Neural Networks for Large-scale Speech Tasks," Neural Networks, vol. 64, 2015 Special Issue. pp. 1-10.

Sak et al., Long Short-Term Memory Recurrent Neural Network Architectures for Large Scale Acoustic Modeling, Interspeech. Singapore. Sep. 14-18, 2014. pp. 1-5.

Senior et al., "Acoustic Modelling with CD-CTC-SMBR LSTM RNNs," IEEE Workshop on Automatic Speech Recognition and Understanding. Scottsdale, Arizona. Dec. 13-17, 2015. pp. 1-6.

Springenberg et al., "Unsupervised and Semi-Supervised Learning with Categorical Generative Adversarial Networks," Published as a Conference Paper at the International Conference on Learning Representations. San Juan, Puerto Rico. May 2-4, 2016. pp. 1-20.

Sricharan et al., "Semi-supervised Conditional GANs," arXiv e-print (arXiv:1708.05789). Available Online at: https://arxiv.org/pdf/1708.05789.pdf. pp. 1-23.

Stylianou et al., "Continuous Probabilistic Transform for Voice Conversion," IEEE Transactions on Speech and Audio Processing, vol. 6, No. 2. Mar. 1998. pp. 1-12.

Sun et al., "Voice Conversion Using Deep Bidirectional Long Short-Term Memory Based Recurrent Neural Networks," IEEE International Conference on Acoustics, Speech and Signal Processing, Apr. 2015. pp. 1-6.

Toda et al., "Voice Conversion Based on Maximum-Likelihood Estimation of Spectral Parameter Trajectory," IEEE Transactions on Audio, Speech and Langauge Processing, vol. 5, No. 8. Nov. 2007 pp. 1-14.

Tzeng et al., "Adversarial Discriminative Domain Adaptation," Conference on Computer Vision and Pattern Recognition. Honolulu, HI. Jul. 21-26, 2017. pp. 1-10.

Tzeng et al., "Simultaneous Deep Transfer Across Domains and Tasks" Conference on Computer Vision and Pattern Recognition. Boston, Massachusetts. Jun. 8-10, 2015. pp. 1-9.

Wang et al., "High-Resolution Image Synthesis and Semantic Manipulation with Conditional GANs," IEEE Transactions on Audio, Speech and Language Processing, vol. 15, 2007. pp. 1-13.

Xue et al., "Topic-Bridged PLSA for Cross-Domain Text Classification," The 31st Annual International ACM Special Interest Group on Information Retrieval. Singapore. Jul. 20-24, 2008. pp. 1-8.

Yi et al., "DualGAN: Unsupervised Dual Learning for Image-to-Image Translation," IEEE International Conference on Computer Vision. Venice, Italy. Oct. 22-29, 2017. pp. 1-17.

Zhou et al., "Improving End-to-End Speech Recognition with Policy Learning," arXiv Preprint, arXiv:1712.07101, 2017. Available Online: https://arxiv.org/pdf/1805.03294.pdf. pp. 1-5.

Zhu et al., "Unpaired Image-to-Image Translation Using Cycle-Consistant Adversarial Networks," IEEE International Conference on Computer Vision, 2017. pp. 1-20.

* cited by examiner

UNSUPERVISED NON-PARALLEL SPEECH DOMAIN ADAPTATION USING A MULTI-DISCRIMINATOR ADVERSARIAL NETWORK

RELATED APPLICATIONS

This application claims priority to U.S. Provisional Patent Application Nos. 62/644,313, filed Mar. 16, 2018 and 62/647,459, filed Mar. 23, 2018, each of which is incorporated by reference herein in its entirety.

TECHNICAL FIELD

The present disclosure relates generally to speech domain adaptation and more specifically to unsupervised non-parallel speech domain adaptation model using a multi-discriminator adversarial network.

BACKGROUND

Automated speech recognition (ASR) and the ability of a system to extract meaning from recorded audio signals have widespread applications, such as speech-to-text conversion. However, ASR can be a complex task, in part because there are many non-linguistic variations in recorded speech, such as the speaker identity, environment noise, accent variation, and/or the like.

Accordingly, it would be advantageous to develop systems and methods for increasing the uniformity of recorded speech to reduce non-linguistic variations and provide more robust and accurate ASR.

In the figures, elements having the same designations have the same or similar functions.

SUMMARY

In some embodiments in accordance with the present disclosure, a system includes a domain adaptation model configured to adapt a representation of a signal in a first domain to a second domain to generate an adapted presentation and a plurality of discriminators corresponding to a plurality of bands. Each of the plurality of bands corresponds to a domain variable range of a domain variable of the first and second domains. Each of the plurality of discriminators is configured to discriminate between the adapted representation and representations of one or more other signals in the second domain.

In some embodiments, the plurality of bands is determined based on a variation of a characteristic feature associated with the domain variable between the first domain and second domain.

In some embodiments, a first discriminator of the plurality of discriminations corresponds to a first band of the plurality of bands having a first range of the domain variable. A second discriminator of the plurality of discriminations corresponds to a second band of the plurality of bands having a second range of the domain variable different from the first range.

In some embodiments, the first domain is a first speech domain and the second domain is a second speech domain.

In some embodiments, the domain variable includes an audio frequency.

In some embodiments, the characteristic feature includes a frequency amplitude variation rate for a fixed time window.

In some embodiments, the system includes a second domain adaptation model configured to adapt a second representation of a second signal in the second domain to the first domain and a plurality of second discriminators corresponding to a plurality of second bands. Each of the plurality of second discriminators being configured to discriminate between the adapted second representation and representations of one or more other signals in the first domain.

In some embodiments, a non-transitory machine-readable medium comprising a plurality of machine-readable instructions which, when executed by one or more processors, are adapted to cause the one or more processors to perform a method. The method includes providing a domain adaptation model configured to adapt a representation of a signal in a first domain to a second domain to generate an adapted presentation. The method further includes providing a plurality of discriminators corresponding to a plurality of bands. Each of the plurality of bands corresponds to a domain variable range of a domain variable of the first and second domains. Each of the plurality of discriminators is configured to discriminate between the adapted representation and representations of one or more other signals in the second domain.

In some embodiments, a first band of the plurality of bands has a first domain variable range. A second band of the plurality of bands has a second domain variable range different from the first domain variable range.

In some embodiments, a first band and a second band of the plurality of bands overlap.

In some embodiments, the method further comprises providing a second domain adaptation model configured to adapt a second representation of a second signal in the second domain to the first domain; and providing a plurality of second discriminators corresponding to a plurality of second bands, each of the plurality of second discriminators being configured to discriminate between the adapted second representation and representations of one or more other signals in the first domain.

In some embodiments, a method for training parameters of a first domain adaptation model using multiple independent discriminators includes providing a plurality of first discriminator models corresponding to a plurality of first bands, each of the plurality of bands corresponding to a domain variable range of a domain variable of a source domain and a target domain. The method further includes evaluating the plurality of first discriminator models based on: one or more first training representations adapted from the source domain to the target domain by the first domain adaptation model, and one or more second training representations in the target domain, yielding a first multi-discriminator objective. The method further includes evaluating a learning objective based on the first multi-discriminator objective; and updating the parameters of the first domain adaptation model based on the learning objective.

In some embodiments, the method includes evaluating a plurality of second discriminator models corresponding to a plurality of second bands of values of the domain variable based on: one or more third training representations adapted from the target domain to the source domain by a second domain adaptation model, and one or more fourth training representations in the source domain, yielding a second multi-discriminator objective. The evaluating the learning objective includes: evaluating the learning objective based on the first multi-discriminator objective and second multi-discriminator objective.

In some embodiments, the method includes evaluating a cycle consistency objective based on: one or more fifth training representations adapted from the source domain to the target domain by the first domain adaptation model and from the target domain to the source domain by the second domain adaptation model; and one or more sixth training representations adapted from the target domain to the source domain by the second domain adaptation model and from the source domain to the target domain by the first domain adaptation model. The evaluating the learning objective includes: evaluating the learning objective based on the first multi-discriminator objective, second multi-discriminator objective, and cycle consistency objective.

In some embodiments, the source domain is a first speech domain and the target domain is a second speech domain.

DETAILED DESCRIPTION

Speech domain adaptation is one technique for increasing the uniformity of recorded speech to reduce non-linguistic variations. In speech domain adaptation, recorded speech in a source domain (e.g., a female speaker domain, a noisy domain, etc.) is adapted to a target domain (e.g., a male speaker domain, a noise-free domain, etc.), and speech recognition is performed on the recorded speech in the target domain. In this manner, a given speech recognition model may be applied to out-of-domain data sets (e.g., a speech recognition model trained using male speakers may be applied to data sets associated with female speakers that are out of the target male speaker domain).

Voice conversion (VC), which may use statistical methods and/or neural network models, is one approach that has been used to perform speech domain adaptation. However, VC models are typically trained using supervised data sets. For example, a VC model for adapting female speech to male speech may be trained using pairs of audio samples that include a female speaker and a male speaker speaking the same words in a temporally aligned manner. Obtaining a statistically significant amount of such supervised training data may be cumbersome, and does not exploit the abundance of available unsupervised training data. For example, there is a vast number of available audio recordings with male speakers and female speakers that may be used as unsupervised training data, but is not suitable for use as supervised training data because most recordings do not include pairs of males and females speaking the same words in a temporally aligned manner.

Accordingly, it is desirable to develop techniques for robust unsupervised speech domain adaptation.

Figure 1:
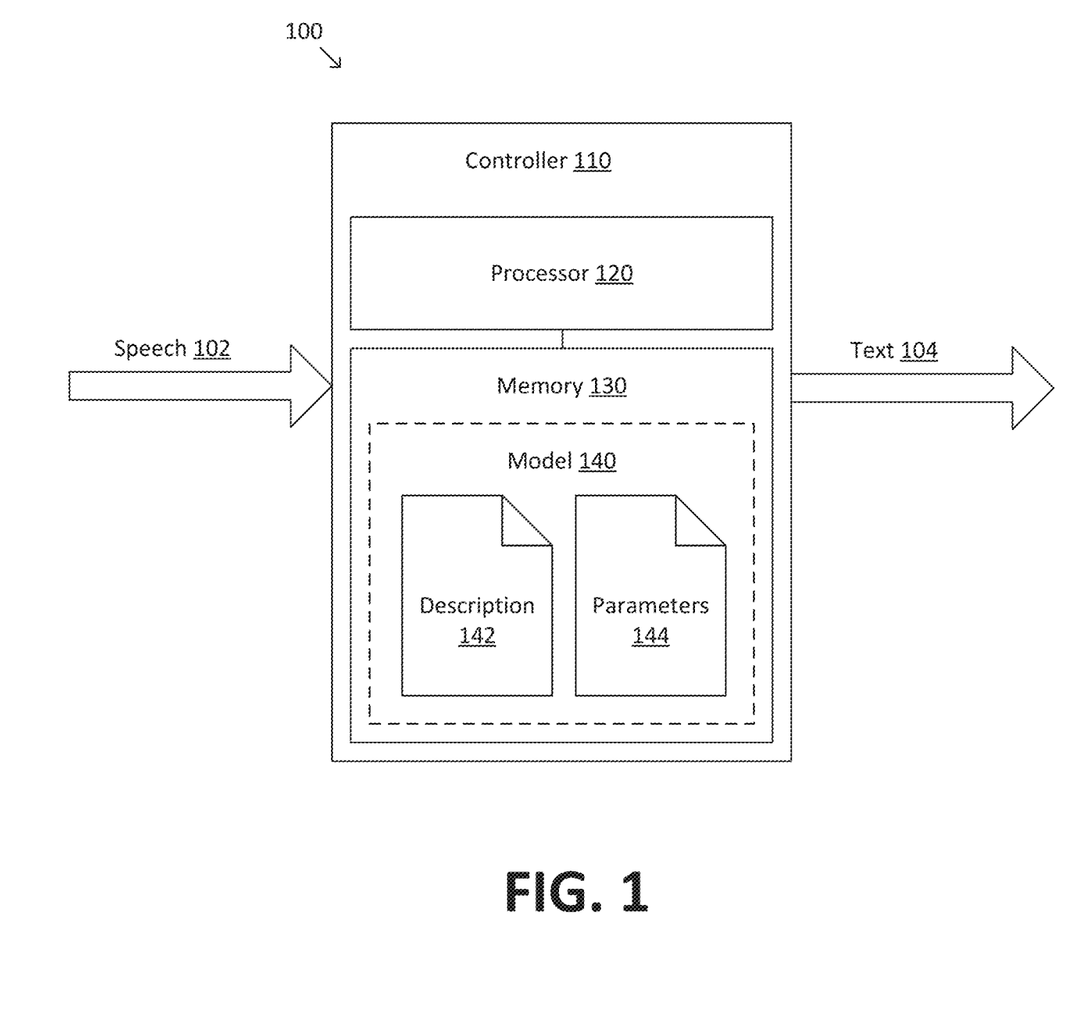
FIG. 1 is a simplified diagram of a system for automated speech recognition (ASR) according to some embodiments.

FIG. 1 is a simplified diagram of a system 100 for automated speech recognition (ASR) according to some embodiments. According to some embodiments, system 100 may receive recorded speech 102 and generate output text 104, where output text 104 corresponds to a predicted transcription of speech 102. It is to be understood that speech-to-text conversion is merely an exemplary application of ASR, and that system 100 may be used to generate a wide variety of output representations that encapsulate the meaning conveyed by recorded speech 102.

As depicted in FIG. 1, system 100 includes a controller 110. In some embodiments, controller 110 may include a processor 120 (e.g., one or more hardware processors). Although processor 120 may include one or more general purpose central processing units (CPUs), processor 120 may additionally or alternately include at least one processor that provides accelerated performance when evaluating neural network models. For example, processor 120 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, pre-processing, and/or the like) by an order of magnitude or more in comparison to a general purpose CPU.

Controller 110 may further include a memory 130 (e.g., one or more non-transitory memories). Memory 130 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 130 may store instructions that are executable by processor 120 to cause processor 120 to perform operations corresponding to processes disclosed herein and described in more detail below.

Processor 120 and/or memory 130 may be arranged in any suitable physical arrangement. In some embodiments, processor 120 and/or memory 130 may be implemented on a same board, in a same package (e.g., system-in-package), on a same chip (e.g., system-on-chip), and/or the like. In some embodiments, processor 120 and/or memory 130 may correspond to distributed, virtualized, and/or containerized computing resources. Consistent with such embodiments, processor 120 and/or memory 130 may be located in one or more data centers and/or cloud computing facilities.

In some embodiments, memory 130 may store a model 140 that is evaluated by processor 120 during ASR. Model 140 may include a plurality of neural network layers. Examples of neural network layers include densely connected layers, convolutional layers, recurrent layers, pooling layers, dropout layers, and/or the like. In some embodiments, model 140 may include at least one hidden layer that is not directly connected to either an input or an output of the neural network. Model 140 may further include a plurality of model parameters (e.g., weights and/or biases) that are learned according to a machine learning process. Examples of machine learning processes include supervised learning, reinforcement learning, unsupervised learning, and/or the like.

Model 140 may be stored in memory 130 using any number of files and/or data structures. As depicted in FIG. 1, model 140 includes a model description file 142 that defines a computational graph of model 140 (e.g., a sequence of neural network layers) and a model parameters file 144 that stores parameters of model 140 (e.g., weights and/or biases). In general, model description file 142 and/or model parameters file 144 may store information associated with model 140 in any suitable format, including but not limited to structured, unstructured, serialized, and/or database formats.

Figure 2:
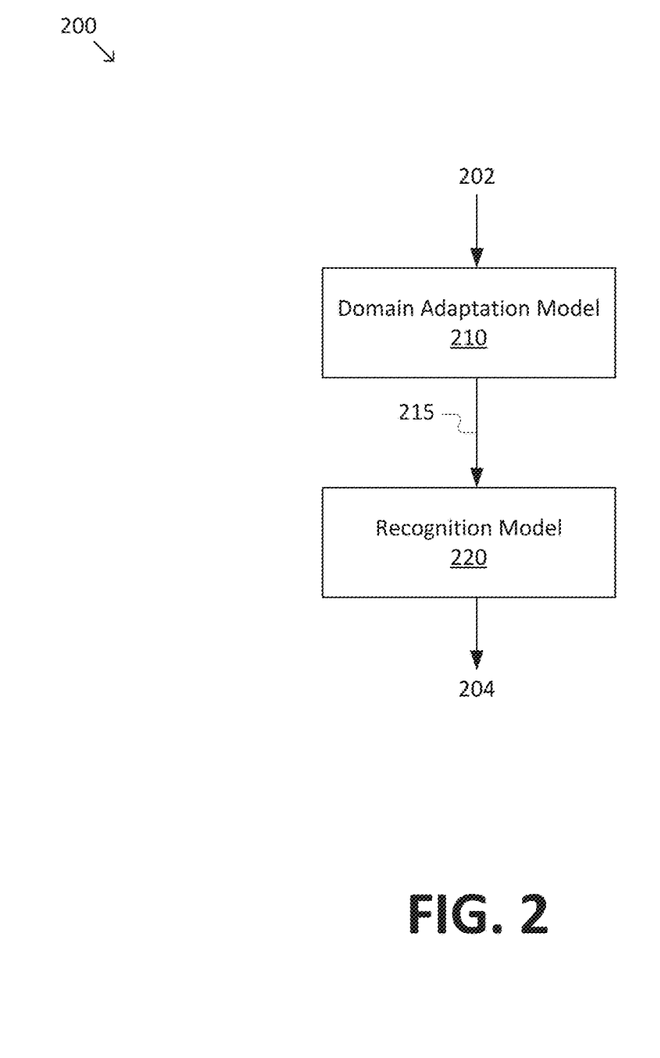
FIG. 2 is a simplified diagram of an ASR pipeline according to some embodiments.

FIG. 2 is a simplified diagram of an ASR pipeline 200 according to some embodiments. According to some embodiments consistent with FIG. 1, ASR pipeline 200 may be implemented by system 100. Consistent with such embodiments, ASR pipeline 200 may receive an input representation 202 (e.g., recorded speech 102) and generate an output representation 204 (e.g., output text 104).

In some embodiments, input representation 202 may include a representation of speech in a source speech domain. For example, input representation 202 may correspond to a recording of one or more of a female speaker, a noisy recording, a speaker with an accent, and/or the like. In some embodiments, input representation 202 may correspond to a spectrogram (or time-frequency) representation that represents the audio frequency spectrum of the speech as a function of time.

In some embodiments, ASR pipeline 200 may include a domain adaptation model 210 to adapt input representation 202 to a target speech domain, yielding an adapted representation 215. For example, domain adaptation model 210 may adapt the recording of a female speaker to resemble a male speaker, may change the accent of the speaker to a different accent, may de-noise the noisy recording, and/or the like. Like input representation 202, adapted representation 215 may correspond to a spectrogram representation.

ASR pipeline 200 may further include a recognition model 220 that performs speech recognition on adapted representation 215 to yield output representation 204, such as a text representation. In some embodiments, the target speech domain of adapted representation 215 may be selected to match the speech domain of recognition model 220. For example, recognition model 220 may be trained using recordings of male voices, noise-free recordings, recordings of speakers with a particular accent, and/or the like. In this regard, including domain adaptation model 210 in ASR pipeline 200 may allow recognition model 220 to be applied with increased accuracy to out-of-domain speech recordings (e.g., speech recordings in a source speech domain that does not correspond to and therefore out of the speech domain of recognition model 220).

In some embodiments, domain adaptation model 210 may correspond to a generative model that generates adapted representation 215 based on input representation 202. There are a variety of approaches that may be used to train generative models. One example is generative adversarial networks (GAN), in which a generative model is pitted against a discriminator model during training. The goal of the discriminator model is to distinguish between actual training samples from a given domain (e.g., spectrograms corresponding to actual male speech) and artificial samples generated by the generative model (e.g., spectrograms adapted from female speech that are intended to mimic male speech). Over time, this adversarial process causes the generative model to become more adept at generating artificial samples that appear "real" and the discriminator model to become more discerning at catching the artificial samples.

For unsupervised learning applications, variations of GAN have been developed, such as cycle-consistent generative adversarial networks (CycleGAN). The CycleGAN approach is described in "Unpaired Image-to-Image Translation using Cycle-Consistent Adversarial Networks," to Zhu et al., which is hereby incorporated by reference in its entirety. In CycleGAN, a pair of generative models are used to convert samples from the source domain to the target domain and vice versa. During training, samples are converted to and from the opposite domain by the pair of generative models to form a cycle. Since cycle consistency is desired (i.e., the original, pre-cycle sample and the post-cycle sample should be the same), one objective of CycleGAN training is to minimize differences between the pre- and post-cycle samples. However, existing CycleGAN implementations generally perform poorly in speech domain adaptation applications. For example, the resulting generative models may produce incorrect results and/or collapse to learning an identity mapping function (e.g., the input representation in the source speech domain and the adapted representation in the target speech domain are the same). Accordingly, it is desirable to develop an improved approach based on CycleGAN to train generative models for speech domain adaptation.

Figure 3:
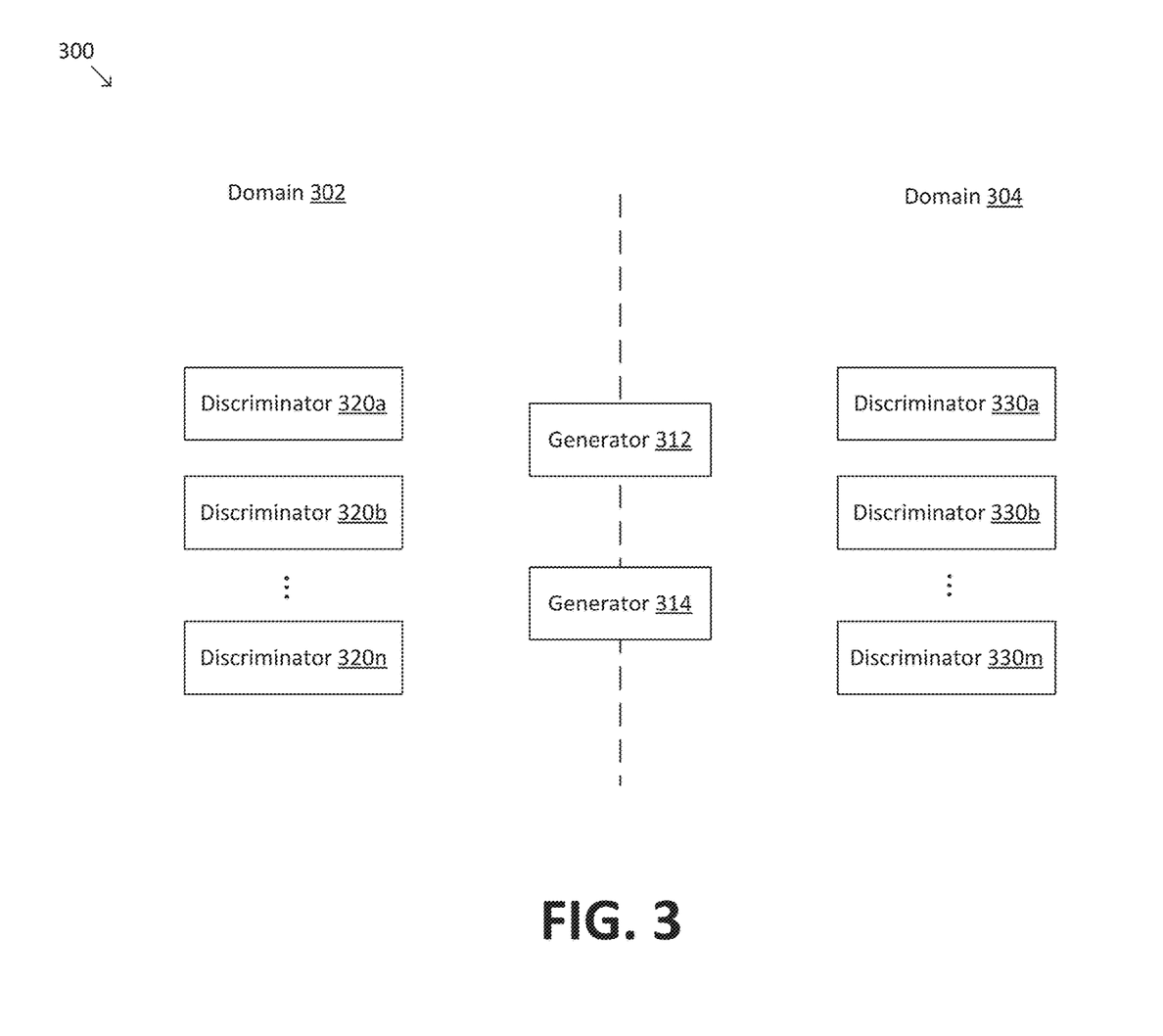
FIG. 3 is a simplified diagram of a multi-discriminator cycle consistent generative adversarial network (CycleGAN) according to some embodiments.

Referring to FIG. 3, illustrated is a simplified diagram of a multi-discriminator CycleGAN 300 according to some embodiments. In general, multi-discriminator CycleGAN 300 provides enhanced performance in domain adaptation applications by using a plurality of discriminator models corresponding bands of domain variable values to perform discrimination during training. For example, in speech domain adaptation applications, it is observed that a particular domain variable, audio frequency, is often a primary source of variation across different speech domains. For example, audio frequency is a major difference between the female and male speech domains. Accordingly, multi-discriminator CycleGAN 300 divides spectrogram representations into a plurality of frequency bands and uses a plurality of discriminator models corresponding to each of the frequency bands to perform discrimination during training.

As illustrated in the example of FIG. 3, multi-discriminator CycleGAN 300 includes generator 312 to adapt spectrogram representations of audio signals from a source speech domain 302 to a target speech domain 304. In some embodiments consistent with FIGS. 1-2, generator 312 may be used to implement domain adaptation model 210. Multi-discriminator CycleGAN 300 may further include a generator 314 to adapt spectrogram representations of audio signals from target speech domain 304 to a source speech domain 302.

Multi-discriminator CycleGAN 300 may further include a plurality of discriminators 320a-n that are assigned to a corresponding plurality of bands in source domain 302 (e.g., audio frequency bands in source speech domain 302). In some embodiments, each of discriminators 320a-n may predict whether a frequency band of a spectrogram representation corresponds to an actual audio signal from source speech domain 302 (e.g., of a real female speaker) or an artificial signal that is artificially generated by generator 314 (e.g., of a male speaker adapted to sound like a female speaker).

Similarly, multi-discriminator CycleGAN 300 may include a plurality of discriminators 330a-m that are assigned to a corresponding plurality of bands (e.g., audio frequency bands) in target domain 304 (e.g., target speech domain 304). In some embodiments, each of discriminators 330a-m may predict whether a corresponding frequency band of a spectrogram representation corresponds to an actual audio signal from target speech domain 304 (e.g., a real male speaker) or is an artificial signal that is artificially generated by generator 314 (e.g., of a female speaker adapted to sound like a male speaker).

In some embodiments, each of discriminators 320a-n and/or 330a-m may be independent. For example, generator 312 may be trained by back-propagation using a plurality of different gradient signals generated independently for each audio frequency band corresponding to discriminators 330a-m. Similarly, generator 314 may be trained by back-propagation using a plurality of different gradient signals generated independently for each audio frequency band corresponding to discriminators 320a-n.

Figure 4A:
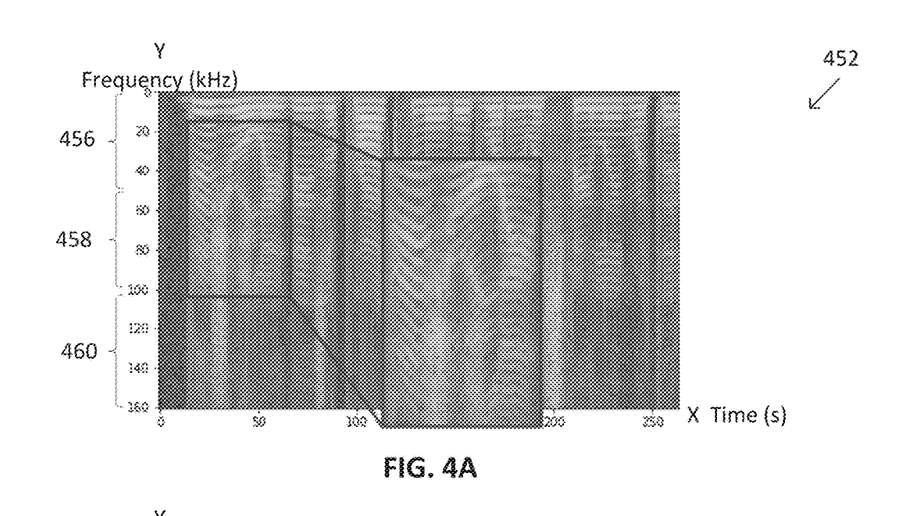
FIG. 4A illustrates a spectrogram of a female speaker domain.
Figure 4B:
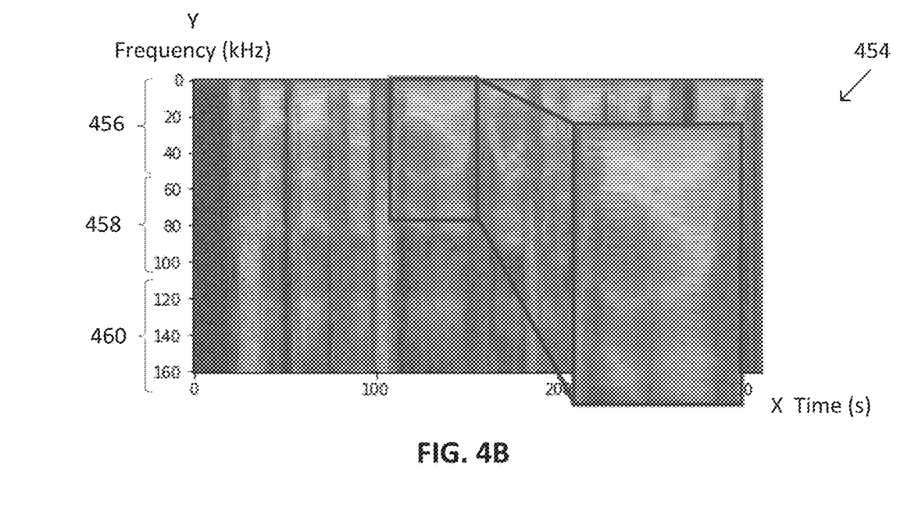
FIG. 4B illustrates a spectrogram of a male speaker domain.
Figure 4C:
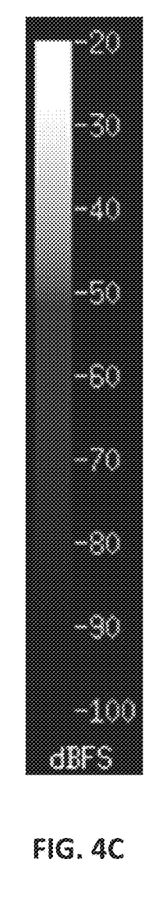
FIG. 4C illustrates a legend for FIGS. 4A and 4B.

Referring to the examples of FIGS. 4A, 4B, and 4C, in some embodiments, the respective ranges of the frequency bands may be determined based on the spectrogram distribution. FIG. 4A illustrates a spectrogram 452 of a domain 302, which is a female speaker domain. FIG. 4B illustrates a spectrogram 454 of a domain 304, which is a male speaker domain. FIG. 4C illustrates the legend for FIGS. 4A and 4B, and indicates that the intensity (shown as brightness in grayscale) in FIGS. 4A and 4B increases when the spectrogram density increases. The frequency bands (e.g., ranges, overlaps, etc.) may be determined based on the spectrogram distribution of spectrograms 452 and 454 and the variations therebetween.

Specifically, in FIGS. 4A and 4B, the X axis represents time, the Y axis represents frequency. A third dimension of the spectrograms 452 and 454 indicates the amplitude of the signal at a particular frequency at a particular time, and represented by the density of each point in the image. As shown in FIGS. 4A and 4B, various characteristic features may be used to characterize the variations of the source and target domains. For example, the characteristic features between male and female spectrograms may include a frequency amplitude variation rate (also referred to as a frequency variation rate) for a fixed time window. As shown in FIGS. 4A and 4B, spectrogram 452 of the female speaker domain is characterized by peaky and high-rate frequency amplitude variations, and spectrogram 454 of the male speaker domain is characterized by smooth frequency amplitude variations. By using different frequency bands, the discriminators may be used to capture the corresponding variations of characteristic features (e.g., frequency amplitude variation rates) between different frequency bands across the source and target domains.

In various embodiments, the frequency bands and their respective properties (e.g., a total number of the bands, the range of each band, overlaps/non-overlaps between bands) may be determined based on the spectrogram distributions of spectrograms 452 and 454 and the variations (e.g., of the characteristic features) therebetween. In some examples, a plurality of non-overlapping bands having different bandwidths may be used. In the example of FIGS. 4A and 4B, three non-overlapping frequency bands 456, 458, and 460 (e.g., m=n=3 in FIG. 3) with 53 kHz, 53 kHz, and 55 kHz bandwidths (also referred to as band range or band width) respectively may be used. In that example, the three bands include a first band including 0 to 53 kHz, the second band including 53 kHz to 106 kHz, and the third band including 106 kHz to 161 kHz.

It is noted that in the example of FIGS. 4A and 4B, bands 456 and 458 have the same bandwidth that is less than the bandwidth of band 460. In some examples, all the bands have the same bandwidths. Alternatively, in some examples, bands may have different bandwidths, and the differences between the bandwidths may be determined based on the variations of the characteristic features. For example, in lower frequencies where the characteristic feature variations are larger, the bandwidths of corresponding bands may be less than the bandwidths of corresponding bands in higher frequencies.

In various embodiments, two adjacent bands may overlap. In an example, a particular frequency range (e.g., 30-35 kHz) may have a large variation (e.g., the largest variation in the entire frequency range) of the characteristic features, and as such, adjacent bands (e.g., a first band including 0 to 35 kHz and a second band including 30 kHz to 100 kHz) may be used, such that that particular frequency range is included in both bands.

It is noted that while speech domains for speech recognition tasks are used as examples in the description herein, the systems and methods described herein may be applied to other suitable types of domains, including, for example, domains associated with music, sonar, radar, seismology, images, consumer behaviors, biomedical information, etc. In various embodiments, bands associated with any domain variable that is a source of variation across the source domain and target domain may be used to perform discrimination during training. For example, in speech domain adaptation applications, while audio frequency bands are often used to perform discrimination during training, bands of other speech domain variables (e.g., volume, speed) may be used. For further example, in image domain adaptation applications, bands of one or more image domain variables (e.g., color, size, shape, resolution, etc.) may be used to perform discrimination during training.

Referring to the examples of FIGS. 5A-5D, multi-discriminator CycleGAN 300 is trained by maximizing the objective $\mathcal{L}_{MD\text{-}CycleGAN}$ given by the following equation:

$$\mathcal{L}_{MD\text{-}CycleGAN} = \mathcal{L}_{MD\text{-}CGAN}(G_X, D_Y^{fi \in m}) + \mathcal{L}_{MD\text{-}CGAN}(G_Y, D_X^{fi \in n}) - \mathcal{L}_{cycle}(G_X, G_Y). \quad \text{(Eq. 1)}$$

The components of Eq. 1 are depicted in FIGS. 5A-5D as follows.

Figure 5A:
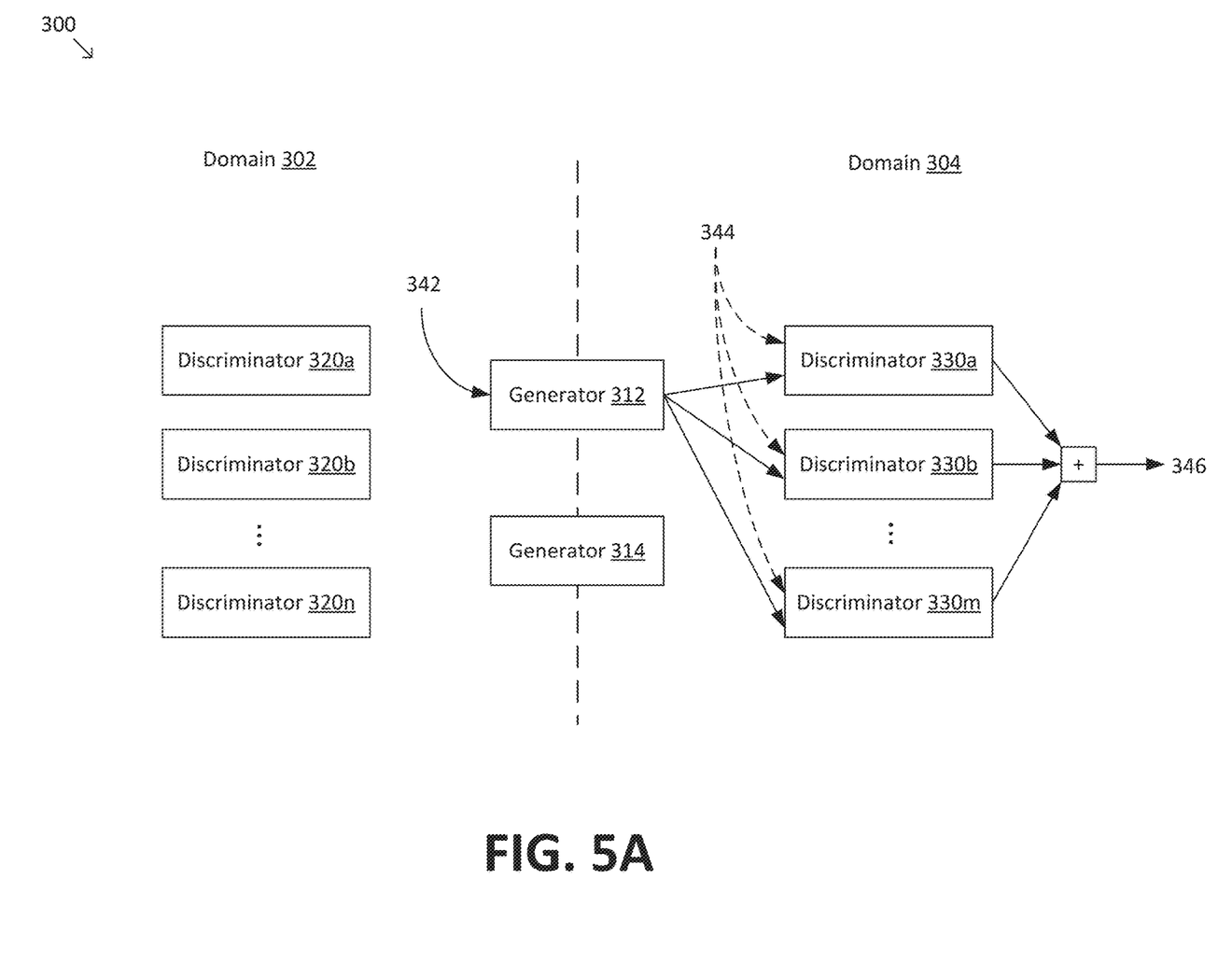
FIGS. 5A-5D are simplified diagrams of a multi-discriminator (CycleGAN) according to some embodiments.

FIG. 5A depicts the evaluation of the term $\mathcal{L}_{MD\text{-}CGAN}(G_X, D_Y^{fi \in m})$ in Eq. 1. A batch of one or more spectrograms 342 from source speech domain 302 is provided to generator 312, which generates a corresponding patch of adapted spectrograms in target speech domain 304. The batch of adapted spectrograms and a batch of one or more spectrograms 344 from target speech domain 304 are divided into frequency bands and provided to discriminators 330a-m, which attempt to distinguish between spectrograms 344 and adapted spectrograms generated by generator 312. The outputs of discriminators 330a-m are aggregated to provide a value 346, which corresponds to $\mathcal{L}_{MD\text{-}CGAN}(G_X, D_Y^{fi \in m})$. In some embodiments, the process depicted in FIG. 4A may be expressed by the following equation:

$$\mathcal{L}_{MD\text{-}CGAN}(G_X, D_Y^{fi \in m}) = \mathbb{E}_{y \sim p_{data}(y)}[\Sigma_{i=1}^m \log D_Y^{fi}(y)] + \mathbb{E}_{x \sim p_{data}(x), z \sim p_z(z)}[\Sigma_{i=1}^m \log D_Y^{fi}(x, G_X(z,x))], \quad \text{(Eq. 2)}$$

where $p_{data}$ denotes a data generating distribution; $p_z$ denotes a model data distribution; $D_Y^{fi}$ denotes the output of one of discriminators 330a-m corresponding to the ith frequency band; $G_X$ denotes the output of generator 312, and m denotes the number of frequency bands in target speech domain 304. In general, Eq. 2 corresponds to a non-saturating version of GAN, where generator 312 is trained by maximizing the probability of predicting generated samples as drawn from data generating distribution $p_{data}$.

Figure 5B:
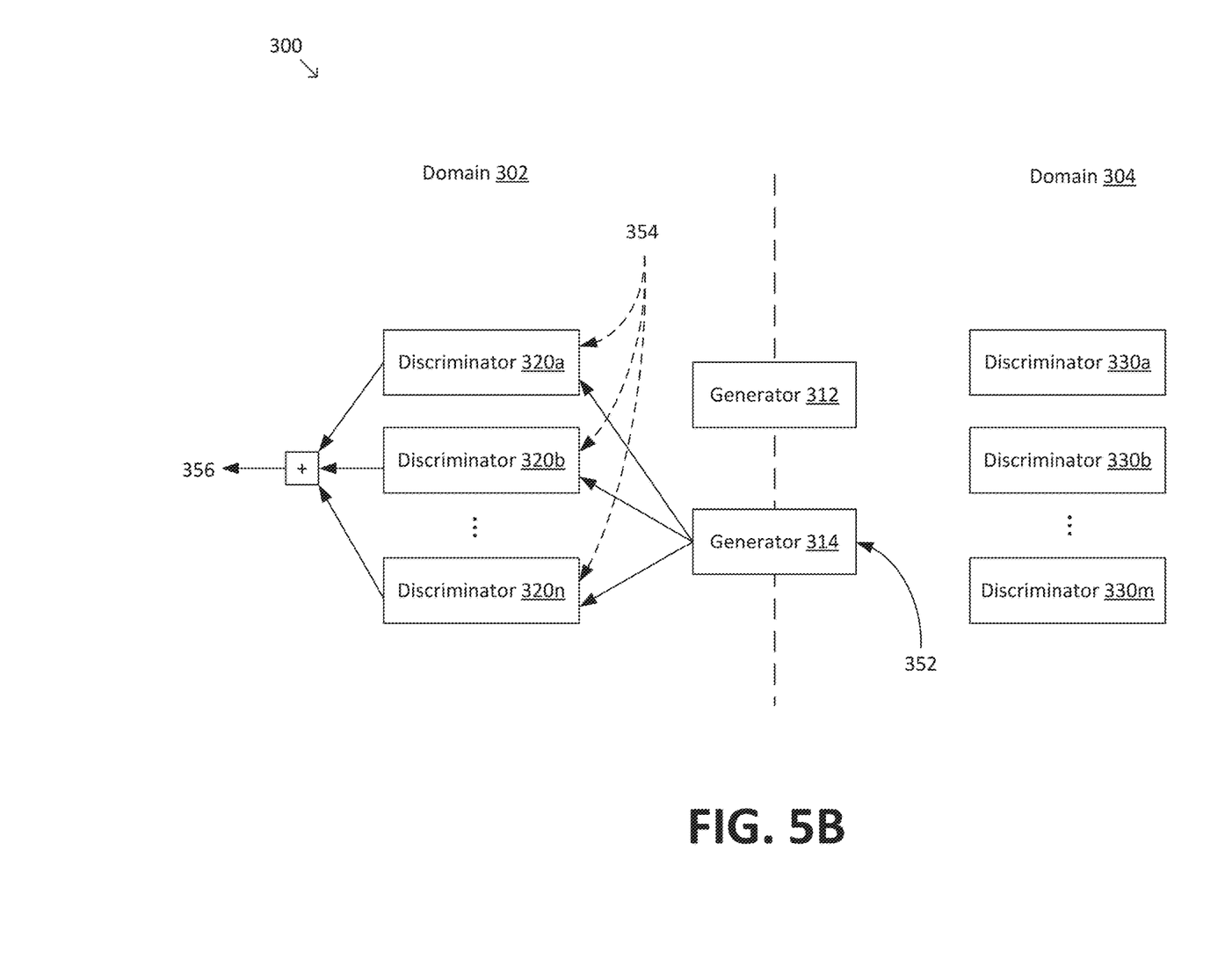

FIG. 5B depicts the evaluation of the term $\mathcal{L}_{MD\text{-}CGAN}(G_Y, D_X^{fi \in n})$ in Eq. 1. A batch of one or more spectrograms 352 from target speech domain 304 is provided to generator 314, which generates a corresponding batch of adapted spectrograms in source speech domain 302. The batch of adapted spectrograms and a batch of one or more spectrograms 354 from source speech domain 302 are divided into frequency bands and provided to discriminators 320a-n, which attempt to distinguish between spectrograms 354 and adapted spectrograms generated by generator 314. The outputs of discriminators 320a-n are aggregated to provide a value 356, which corresponds to $\mathcal{L}_{MD\text{-}CGAN}(G_Y, D_X^{fj\in n})$. In some embodiments, the process depicted in FIG. 5B may be expressed by the following equation:

$$\mathcal{L}_{MD\text{-}CGAN}(G_Y,D_X^{fj\in n}) = \mathbb{E}_{x\sim p_{data}(x)}[\Sigma_{j=1}^{n} \log D_X^{fj}(x)] + \mathbb{E}_{y\sim p_{data}(y), z\sim p_z(z)}[\Sigma_{j=1}^{n} \log D_X^{fj}(y, G_Y(z,y))], \quad (Eq. 3)$$

where $p_{data}$ denotes a data generating distribution; $p_z$ denotes a model data distribution; $D_X^{fj}$ denotes the output of one of discriminators 320a-n corresponding to the jth frequency band; $G_Y$ denotes the output of generator 314, and n denotes the number of frequency bands in source speech domain 302.

Figure 5C:
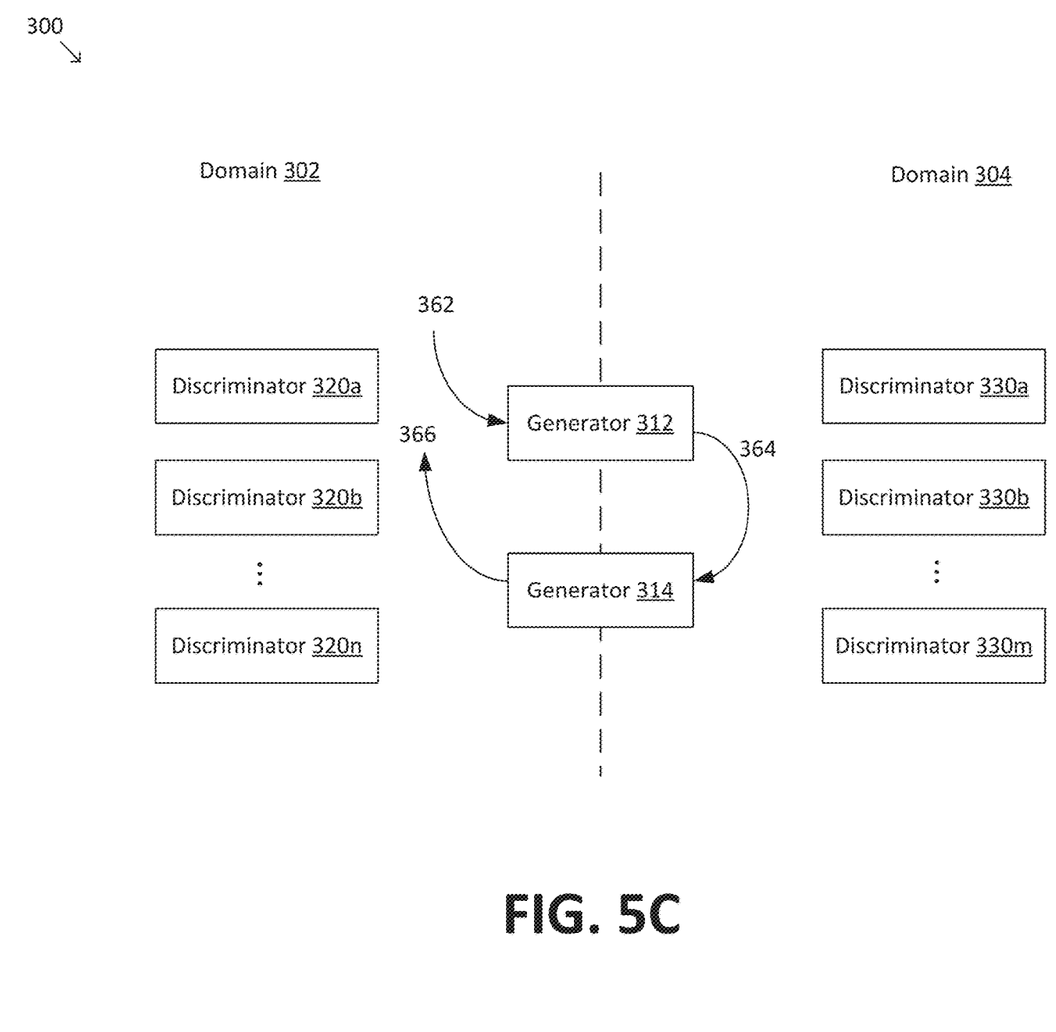
Figure 5D:
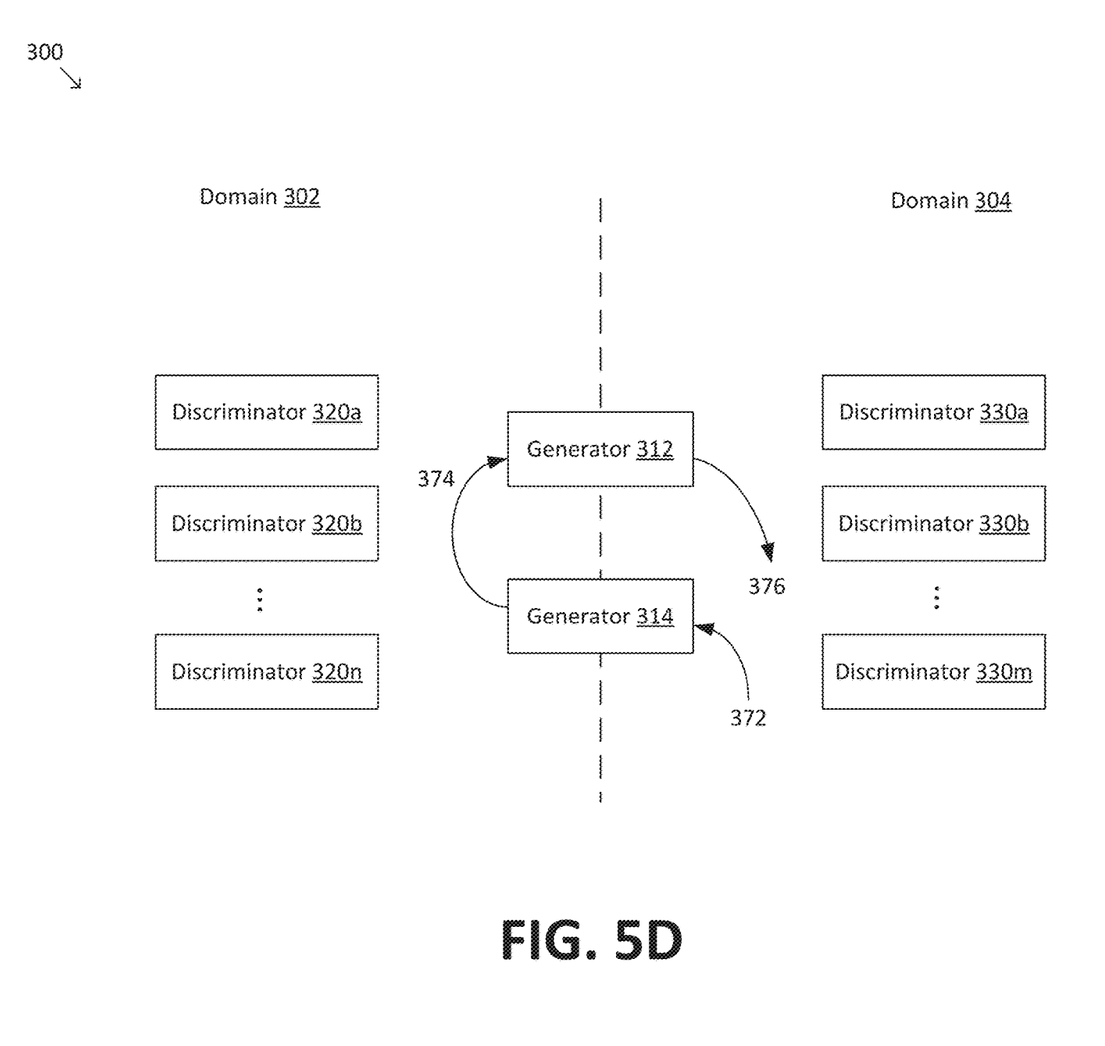

FIGS. 5C and 5D depict the evaluation of the term $\mathcal{L}_{cycle}(G_X, G_Y)$ in Eq. 1. In FIG. 5C, a batch of one or more spectrograms 362 from source speech domain 302 is provided to generator 312, which generates a corresponding batch of adapted spectrograms 364 in target speech domain 304. Adapted spectrograms 364 are provided to generator 314, which generates a batch of spectrograms 366 for comparison to spectrograms 362 to assess cycle consistency. For example, cycle consistency loss may be evaluated using the $l_1$ norm. Similarly, in FIG. 5D, a batch of one or more spectrograms 372 from target speech domain 304 is provided to generator 314, which generates a corresponding batch of adapted spectrograms 374 in source speech domain 304. Adapted spectrograms 374 are provided to generator 312, which generates a batch of spectrograms 376 for comparison to spectrograms 372 to assess cycle consistency. For example, cycle consistency loss may be evaluated using the $l_1$ norm. In some embodiments, the process depicted in FIGS. 4C and 4D may be expressed by the following equation:

$$\mathcal{L}_{cycle}(G_X, G_Y) = \mathbb{E}_{x\sim p_{data}(x)}[\|G_Y(G_X(x))-x\|_1] + \mathbb{E}_{y\sim p_{data}(y)}[\|G_X(G_Y(y))-y\|_1]. \quad (Eq. 4)$$

It is to be understood that FIGS. 5A-5D are merely examples, and many variations are possible. According to some embodiments, multi-discriminator CycleGAN 300 may include multiple generators 312 (e.g., a plurality of generators 312 and 314 corresponding to the plurality of discriminators 320a-n and 330a-m. In a one-to-one setting, each of the plurality of generators may be trained at a specific frequency band that matches a corresponding discriminator, mathematically expressed as $\{(G_X^{fi}, D_X^{fi}):i\in m\}$. In a one-to-many setting, each of the plurality of generators may be trained with more than one corresponding discriminator (and/or all discriminators), mathematically expressed as $\{(G_X^{fi}, D_X^{fj\in m}):j\in n\}$.

Figure 6:
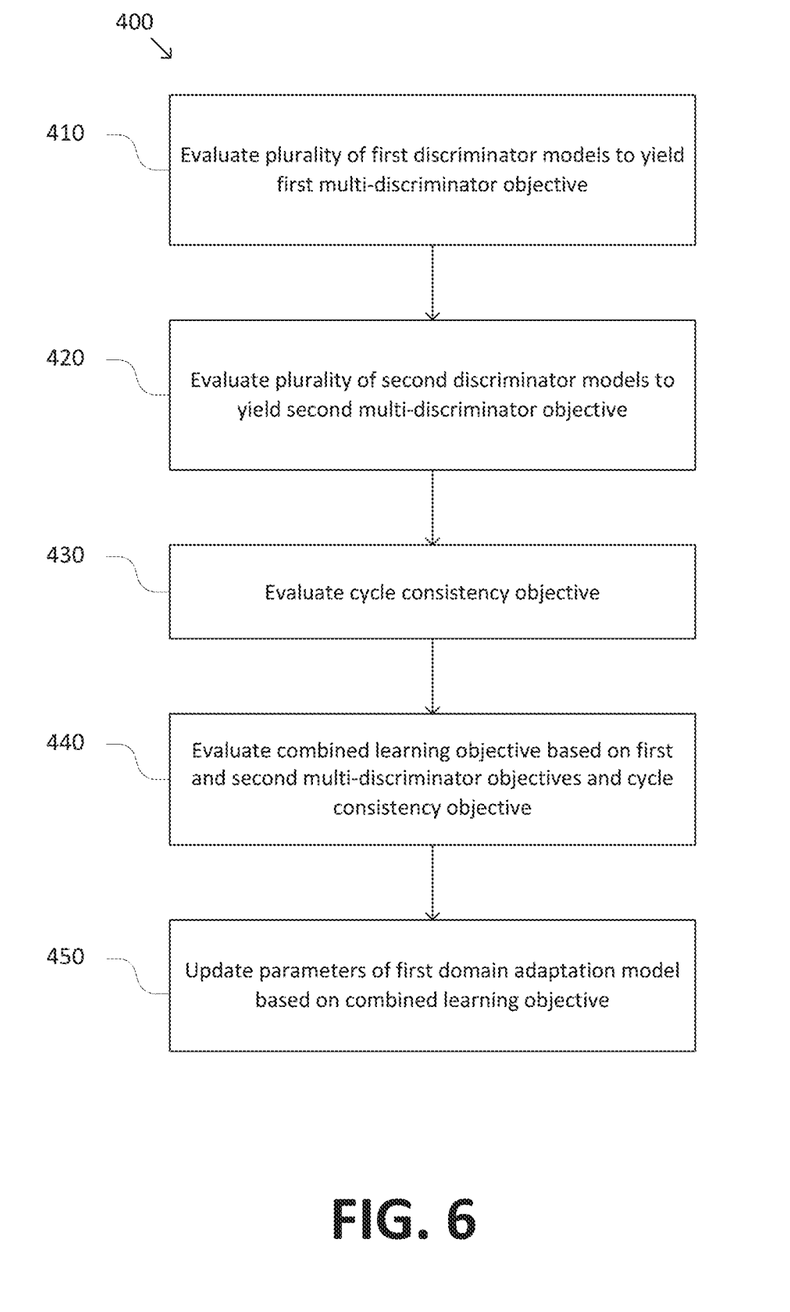
FIG. 6 is a simplified diagram of a method for training a domain adaptation model using a multi-discriminator CycleGAN according to some embodiments.

FIG. 6 is a simplified diagram of a method 400 for training a domain adaptation model, such as domain adaptation model 210, using a multi-discriminator CycleGAN, such as multi-discriminator CycleGAN 300. In some embodiments consistent with FIGS. 1-5D, method 400 may be performed by processor 120 during training and/or evaluation of model 140.

At a process 410, a plurality of first discriminator models corresponding to a plurality of first audio frequency bands are evaluated based on one or more first training spectrograms adapted from a source speech domain to a target speech domain by a first domain adaptation model and one or more second training spectrograms in the target speech domain. In some embodiments, the plurality of first discriminator models may be evaluated in accordance with Eq. 2. In some embodiments, the first and second training spectrograms may be selected from an unsupervised and/or non-parallel set of training data. In some embodiments, the results of evaluating the plurality of first discriminator models may be aggregated to yield a first multi-discriminator objective.

At a process 420, a plurality of second discriminator models corresponding to a plurality of second audio frequency bands are evaluated based on one or more third training spectrograms adapted from the target speech domain to the source speech domain by a second domain adaptation model and one or more fourth training spectrograms in the source speech domain. In some embodiments, the plurality of second discriminator models may be evaluated in accordance with Eq. 3. In some embodiments, the third and fourth training spectrograms may be selected from an unsupervised and/or non-parallel set of training data. In some embodiments, the results of evaluating the plurality of second discriminator models may be aggregated to yield a second multi-discriminator objective.

At a process 430, a cycle consistency objective is evaluated based on one or more fifth training spectrograms adapted from the source speech domain to the target speech domain by the first domain adaptation model and from the target speech domain to the source speech domain by the second domain adaptation model, and one or more sixth training spectrograms adapted from the target speech domain to the source speech domain by the second domain adaptation model and from the source speech domain to the target speech domain by the first domain adaptation model. In some embodiments, the cycle consistency objective may be evaluated in in accordance with Eq. 4.

At a process 440, a combined learning objective is evaluated based on the first and second multi-discriminator objectives evaluated at processes 410 and 420, respectively, and the cycle consistency objective evaluated at process 430. In some embodiments, the combined learning objective may be evaluated in in accordance with Eq. 1.

At a process 440, the parameters of at least the first domain adaptation model are updated based on the combined learning objective. In some embodiments, the model parameters may be updated using an optimizer. In some embodiments, the parameters may be updated by determining gradients of the learning objective with respect to each of the model parameters and updating the parameters based on the gradients. For example, the gradients may be determined by back propagation. In this manner, the parameters of the first domain adaptation model are trained based on the training spectrograms such that the first domain adaptation model may be applied in an ASR pipeline, such as ASR pipeline 200.

This application is further described with respect to the attached documents ("A Multi-Discriminator CycleGAN for Unsupervised Non-Parallel Speech Domain Adaptation," 5 pp, and supplementary Tables 1 and 2, 1 pp), which are considered part of this disclosure and the entirety of which are incorporated by reference.

Although illustrative embodiments have been shown and described, a wide range of modification, change and substitution is contemplated in the foregoing disclosure and in some instances, some features of the embodiments may be employed without a corresponding use of other features.

One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
a domain adaptation model configured to adapt a representation of a signal in a first domain to a second domain to generate an adapted presentation; and
a plurality of discriminators corresponding to a plurality of bands,
wherein each of the plurality of bands corresponds to a domain variable range of a domain variable of the first and second domains,
wherein the plurality of bands is determined based on a variation of a characteristic feature associated with the domain variable between the first domain and second domain, and
wherein each of the plurality of discriminators is configured to discriminate between the adapted representation and representations of one or more other signals in the second domain.

2. The system of claim 1, wherein bandwidths of the plurality of bands are determined based on the corresponding characteristic feature variations.

3. The system of claim 1, wherein a first discriminator of the plurality of discriminators corresponds to a first band of the plurality of bands having a first width of the domain variable, and
wherein a second discriminator of the plurality of discriminators corresponds to a second band of the plurality of bands having a second width of the domain variable different from the first range.

4. The system of claim 1, wherein the first domain is a first speech domain and the second domain is a second speech domain.

5. The system of claim 4, wherein the domain variable includes an audio frequency.

6. The system of claim 5, wherein the characteristic feature includes a frequency amplitude variation rate for a fixed time window.

7. The system of claim 1, further comprising:
a second domain adaptation model configured to adapt a second representation of a second signal in the second domain to the first domain; and
a plurality of second discriminators corresponding to a plurality of second bands, each of the plurality of second discriminators being configured to discriminate between the adapted second representation and representations of one or more other signals in the first domain.

8. A non-transitory machine-readable medium comprising a plurality of machine-readable instructions which, when executed by one or more processors, are adapted to cause the one or more processors to perform a method comprising:
providing a domain adaptation model configured to adapt a representation of a signal in a first domain to a second domain to generate an adapted presentation; and
providing a plurality of discriminators corresponding to a plurality of bands,
wherein each of the plurality of bands corresponds to a domain variable range of a domain variable of the first and second domains,
wherein the plurality of bands is determined based on a variation of a characteristic feature associated with the domain variable between the first domain and second domain, and
wherein each of the plurality of discriminators is configured to discriminate between the adapted representation and representations of one or more other signals in the second domain.

9. The non-transitory machine-readable medium of claim 8, wherein wherein bandwidths of the plurality of bands are determined based on the corresponding characteristic feature variations.

10. The non-transitory machine-readable medium of claim 8, wherein a first band of the plurality of bands has a first domain variable range; and
wherein a second band of the plurality of bands has a second domain variable range different from the first domain variable range.

11. The non-transitory machine-readable medium of claim 8, where a first band and a second band of the plurality of bands overlap.

12. The non-transitory machine-readable medium of claim 8, wherein the first domain is a first speech domain and the second domain is a second speech domain.

13. The non-transitory machine-readable medium of claim 12, wherein the domain variable is an audio frequency.

14. The non-transitory machine-readable medium of claim 8, wherein the method further comprises:
providing a second domain adaptation model configured to adapt a second representation of a second signal in the second domain to the first domain; and
providing a plurality of second discriminators corresponding to a plurality of second bands, each of the plurality of second discriminators being configured to discriminate between the adapted second representation and representations of one or more other signals in the first domain.

15. A method for training parameters of a first domain adaptation model using multiple independent discriminators, comprising:
providing a plurality of first discriminator models corresponding to a plurality of first bands, each of the plurality of bands corresponding to a domain variable range of a domain variable of a source domain and a target domain,
wherein the plurality of bands is determined based on a variation of a characteristic feature associated with the domain variable between the first domain and second domain;
evaluating the plurality of first discriminator models based on:
one or more first training representations adapted from the source domain to the target domain by the first domain adaptation model, and
one or more second training representations in the target domain, yielding a first multi-discriminator objective;
evaluating a learning objective based on the first multi-discriminator objective; and
updating the parameters of the first domain adaptation model based on the learning objective.

16. The method of claim 15, further comprising:
evaluating a plurality of second discriminator models corresponding to a plurality of second bands of values of the domain variable based on:

one or more third training representations adapted from the target domain to the source domain by a second domain adaptation model, and one or more fourth training representations in the source domain, yielding a second multi-discriminator objective;

wherein the evaluating the learning objective includes:

evaluating the learning objective based on the first multi-discriminator objective and second multi-discriminator objective.

17. The method of claim 16, further comprising:

evaluating a cycle consistency objective based on:

one or more fifth training representations adapted from the source domain to the target domain by the first domain adaptation model and from the target domain to the source domain by the second domain adaptation model; and one or more sixth training representations adapted from the target domain to the source domain by the second domain adaptation model and from the source domain to the target domain by the first domain adaptation model;

wherein the evaluating the learning objective includes:

evaluating the learning objective based on the first multi-discriminator objective, second multi-discriminator objective, and cycle consistency objective.

18. The method of claim 15, wherein the source domain is a first speech domain and the target domain is a second speech domain.

19. The method of claim 16, wherein the domain variable is an audio frequency.

20. The method of claim 15, further comprising:

wherein a first discriminator of the plurality of discriminators corresponds to a first band of the plurality of bands having a first range of the domain variable, and wherein a second discriminator of the plurality of discriminators corresponds to a second band of the plurality of bands having a second range of the domain variable different from the first range.

* * * * *